United States Patent
Ohara et al.

[11] Patent Number: 6,084,564
[45] Date of Patent: Jul. 4, 2000

[54] APPARATUS FOR DETERMINING A BLACK POINT ON A DISPLAY UNIT AND METHOD OF PERFORMING THE SAME

[75] Inventors: Kiyotaka Ohara, Nagoya; Masaaki Hibino, Yokkaichi; Koji Kobayakawa, Ichinomiya; Masashi Ueda, Nagoya; Masaaki Hori, Tajimi; Yasunari Yoshida, Aichi-ken, all of Japan

[73] Assignee: Brother Kogyo Kabushiki Kaisha, Nagoya, Japan

[21] Appl. No.: 08/857,831
[22] Filed: May 16, 1997
[30] Foreign Application Priority Data May 16, 1996 [JP] Japan ............................... 8-121835

[51] Int. Cl.⁷ ....................................... G09G 5/00
[52] U.S. Cl. .................... 345/113; 345/20; 345/114; 345/904; 348/177; 348/178; 348/179
[58] Field of Search ..................... 345/10, 12, 16–18, 345/20, 63, 77, 147–149, 418–469, 112–118, 904; 348/177–179

[56] References Cited

U.S. PATENT DOCUMENTS

| | | | |
|---|---|---|---|
| 4,962,418 | 10/1990 | Kamaga | 358/29 |
| 5,254,981 | 10/1993 | Disanto et al. | 345/107 |
| 5,512,961 | 4/1996 | Cappels, Sr. | 348/658 |
| 5,561,459 | 10/1996 | Stokes et al. | 348/180 |
| 5,638,117 | 6/1997 | Engeldrum et al. | 348/179 |
| 5,774,112 | 6/1998 | Kasson | 345/153 |

*Primary Examiner*—Richard A. Hjerpe
*Assistant Examiner*—Henry N. Tran
*Attorney, Agent, or Firm*—Oliff & Berridge, PLC

[57] ABSTRACT

To facilitate determination of a black point on a display unit, a reference brightness region and a comparison brightness region are displayed on the display unit. The former emits at a reference brightness that is used as a reference for determining the black point. The reference brightness is set by inputting a predetermined input value to the display unit. The brightness on the comparison brightness region is compared with the reference brightness. The comparison brightness is changed by increasing and decreasing the input value to the display unit to obtain a critical input value representing the input value wherein an operator can first distinguish the comparison brightness region from the reference brightness region. The two regions are arranged so that the comparison brightness region which is, for example, a star mark is completely surrounded by the reference brightness region, or vice versa.

26 Claims, 7 Drawing Sheets

APPARATUS FOR DETERMINING A BLACK POINT ON A DISPLAY UNIT AND METHOD OF PERFORMING THE SAME

BACKGROUND OF THE INVENTION

1. Field of the Invention

The present invention relates to an apparatus for determining a black point on a display and a method of performing the same.

2. Description of the Related Art

Conventionally, it has been known that CRT displays have a non-linear display characteristic on input value X applied to a display driver vs. relative brightness Yd as shown in FIG. 1. A transit input value X leaving the zero level of the relative brightness is called "Black Point (BP)". As is well known in the art, by representing the minimum level of each of the input value X, the relative brightness Yd with a digital number 0 (zero), and the maximum level thereof with a digital number 255, the display characteristic of the CRT displays can be approximated with the following exponential functions.

When X<BP, then Yd=0.

When X≧BP, then $$Yd=\{(X-BP)/(255-BP)\}^{\gamma} \times 255$$

where γ is a predetermined constant specific to the CRT display but is changeable due to, for example, aging of the CRT display.

The black point BP can be changed by a brightness adjusting mechanism provided in the display. The black point also changes due to aging of the display and is seen to be different in level depending on the perception of individuals watching the display. The exact level of the black point BP can make it possible to match the input value with the actual perceived color.

Here a conventional method for determining the black point will be described. As shown in FIG. 2, a reference brightness region A corresponding to X=0 and a comparison brightness regions B corresponding to X>0 are displayed side-by-side on a display. The user increases or decreases the input value for the comparison brightness region B until the comparison brightness region B is first distinguishable from the reference brightness region A. The black point is determined based on the input value at which the distinction between the two regions is first possible.

However, quick determination of the black point may not be achieved if the extent to increase or decrease the input value is not controlled precisely. It has been desired that the determination of the black point be readily feasible for a person who is not accustomed to the above-described method.

SUMMARY OF THE INVENTION

In light of the foregoing, it is an object of the present invention to ease the determination of a black point by setting a comparison brightness region so as to be easily distinguished from a reference brightness region.

To achieve the above and other objects, there is provided a method of determining a black point on a display unit, wherein a first region and a second region are displayed on the display unit. The first region emits at a reference brightness and the brightness on the second region is changed and compared with the reference brightness. The reference brightness is used as a reference or criteria for determining the black point. The reference brightness is set by inputting a predetermined input value to the display unit. The first region and the second region are arranged on the display unit so that one is completely surrounded by the other. The input value input to the display unit to display the second region is increased or decreased to obtain a critical input value representing the input value wherein an operator can first distinguish the second region from the first region. The black point is determined based on the critical input value.

The first region may be displayed on the display unit as a background for the second region. Alternatively, the second region may be displayed on the display unit as a background for the first region. In the former case, it is desirable that the second region take a form of a character, a symbol or a figure. In the latter case, it is desirable that the first region take a form of a character, a symbol or a figure.

According to another aspect of the invention, the second region may have at least one contour line defining an outline of the second region. The contour line is such that it intersects an imaginary vertical line drawn on the display unit when the display unit is placed in an orientation in which it is intended to be used. In this case, the first region and the second region may have an area substantially equal to each other.

According to still another aspect of the invention, either the first region or the second region may be defined only by lines.

According to yet another aspect of the invention, the second region may be displayed in a flickering mode by alternately inputting the predetermined input value and the input value to the display unit wherein the second region alternately emits at a brightness equal to the reference brightness and at a brightness corresponding to the input value.

According to the present invention, there is provided an apparatus for determining a black point on a display unit, that includes first region generating means for generating a reference brightness region on the display unit, a second region generating means for generating a comparison brightness region on the display unit, increasing/decreasing means for increasing and decreasing the input value for displaying the comparison brightness region, instruction input means for allowing an operator to input an instruction regarding determination of the black point, and black point computing means for computing the black point based on the input value set by the increasing/decreasing means when the operator inputs the instruction through the instruction input means. The reference region emits at a reference brightness that is used as a reference for determining the black point. The reference brightness is set by inputting a predetermined input value to the display unit. The comparison brightness region emits at a comparison brightness set by inputting an input value differing from the predetermined input value.

One of the reference brightness region and the comparison brightness region is completely surrounded by another. Specifically, the reference brightness region is completely surrounded by the comparison brightness region or conversely, the comparison brightness region is completely surrounded by the reference brightness region.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

Figure 1:
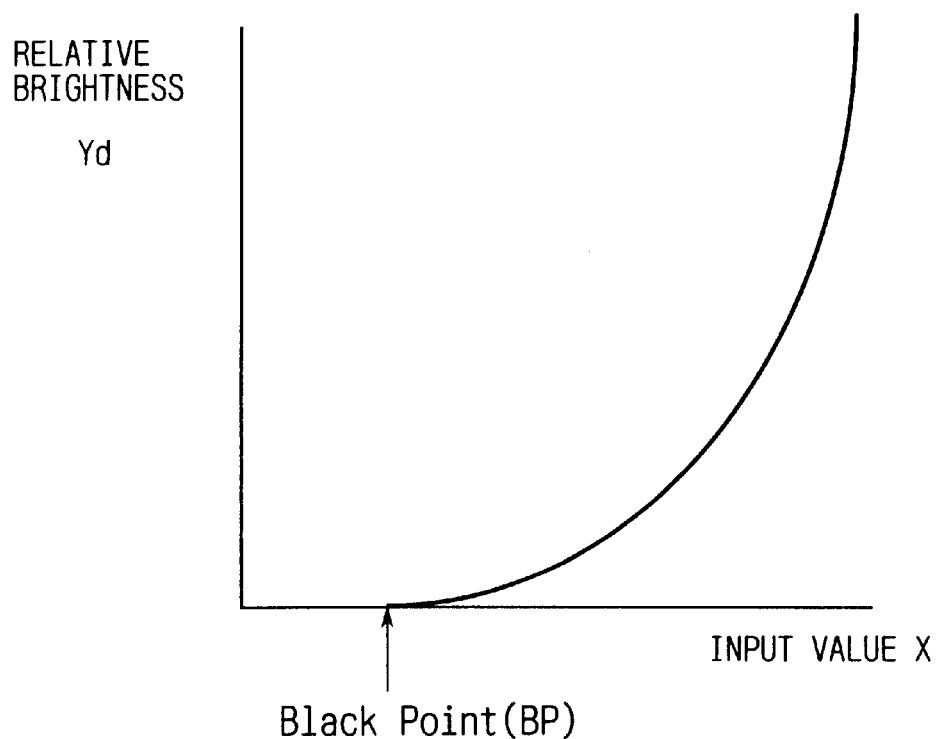
FIG. 1 is an explanatory diagram showing a display characteristic of a general display unit.
Figure 2:
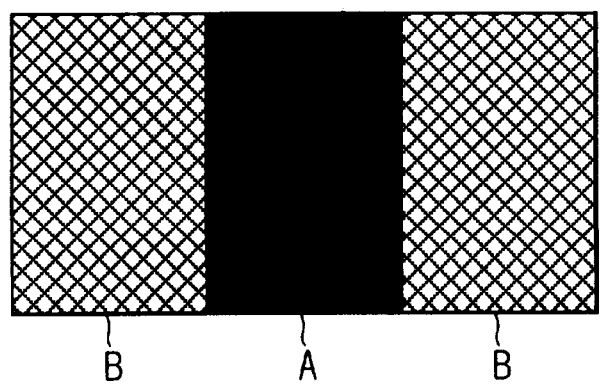
FIG. 2 is an explanatory diagram showing a conventional method for determining a black point.
Figure 3:
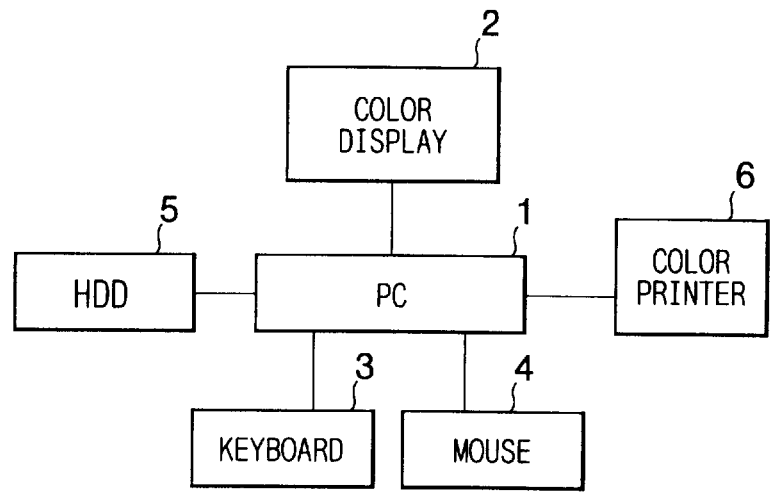
FIG. 3 is a block diagram showing an arrangement of a system according to a first embodiment of the present invention.

A system used in various embodiments of the present invention is shown in FIG. 3. The system includes a personal computer (PC) 1 and a color display unit 2 connected to each other. The PC 1 is provided with a keyboard 3, a mouse 4, a hard disk (HDD) 5 and a color printer 6. The PC 1 has a ROM in which a black point determination program has been installed. The program may be installed in the hard disk 5.

A first embodiment of the present invention will be described while referring to the flowchart shown in FIG. 5. The flowchart shown therein illustrates the black point determination program.

Figure 4:
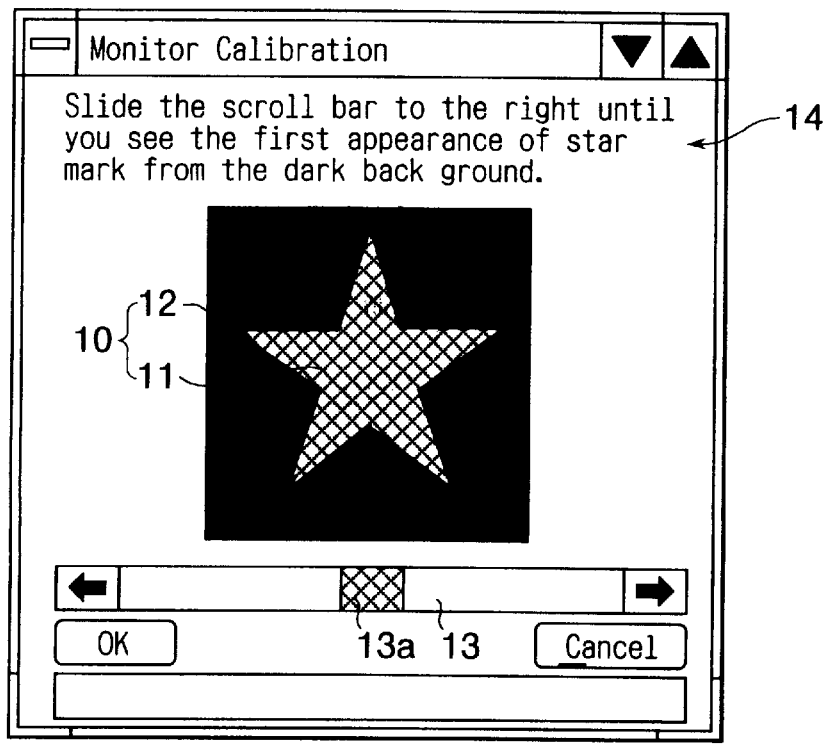
FIG. 4 is an explanatory diagram showing a screen used when determining a black point according to the first embodiment of the present invention.

In this program, the black point is determined by using a test image 10 shown in FIG. 4. The test image 10 consists of a star mark 11 and its background portion 12. A scroll bar 13 is displayed beneath the test image 10. The slider 13a of the scroll bar 13 can be moved horizontally by the use of the mouse 4. An explanation to a user on how to determine the black point appears at the upper portion of the test image 10, which reads "Slide the scroll bar to the right until you see the first appearance of star mark from the dark background.". In the following description, the star mark 11 will be referred to as "comparison brightness region 11", and its background portion as "reference brightness region 12". An input value applied to a display driver (not shown) to create the comparison brightness region 11 on the color display unit 2 will be represented by $X_{cmpr}$ and the input value applied to the display driver to create the reference brightness region 12 on the color display unit 12 by $X_{base}$. The input value $X_{base}$ is fixed to zero (0) and $X_{cmpr}$ is variable in a range from 0 to 255. Each pixel in the reference brightness region 12 emits light when $R=G=B=X_{base}$, so that the brightness on the display 2 is at the lowest level, i.e., black. Here, R represents the level to emit red light, G to emit green light, and B to emit blue light.

Figure 5:
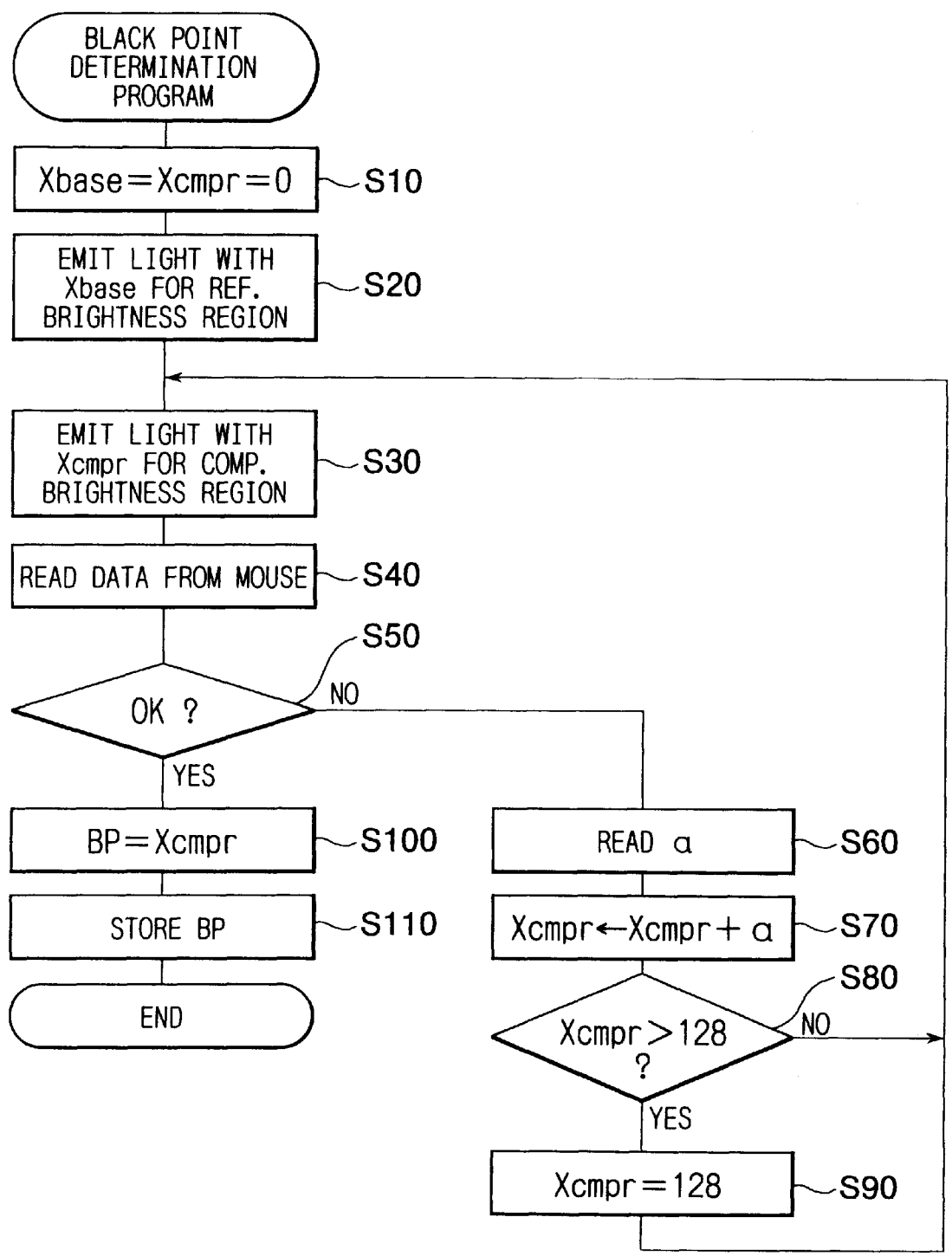
FIG. 5 is a flowchart for illustrating a black point determination program according to the first embodiment of the present invention.

The black point determination program is illustrated in FIG. 5 by way of a flowchart. When the program starts, the input values $X_{base}$ and $X_{cmpr}$ are set to zeroes (S10). Each pixel in the reference brightness region 12 emits light under a condition where $R=G=B=X_{base}$, and each pixel in the comparison brightness region 11 emits light under a condition where $R=G=B=X_{cmpr}$ (S20, S30). Assuming that $X_{cmpr}$ is less than the black point BP, then the test image 10 including the star mark 11 and its background portion 12 displayed on the screen is blackened in its entirety.

Next, the operating condition of the mouse 4 is read (S40) and determination is made as to whether the mouse 4 is clicked by an operator to indicate "OK" (S50). When the "OK" indication is not entered (S50: No), a slicing amount α of the slider 13a is read (S60). Then, the input value $X_{cmpr}$ is updated based the sliding amount α (S70). The sliding amount α takes a negative value when the slider 13a moves leftwardly. In this embodiment, the input value $X_{cmpr}$ is restricted so as not to exceed 128, i.e., $X_{cmpr} \leq 128$ (S80, S90). Therefore, fine adjustment of the input value $X_{cmpr}$ is possible in a range between 0 (zero) to 128 through the sliding movement of the slider 13a.

When the mouse 4 is clicked to indicate "OK" (S50: Yes), the value of $X_{cmpr}$ is determined as the black point BP (S100) and stored it in the hard disk 5 (S110).

According to the first embodiment, the black point is determined by using a well known star mark in the comparison brightness region. Because the black point can be determined when the star mark is recognized on the screen, it is easy for the operator to make the determination. Further, an operation time required for the determination of the black point is short. In addition, minute change in the brightness of the star mark can be readily discriminated, because the brightness of the star mark is gradually increased so as to depart from the black background.

Figure 6:
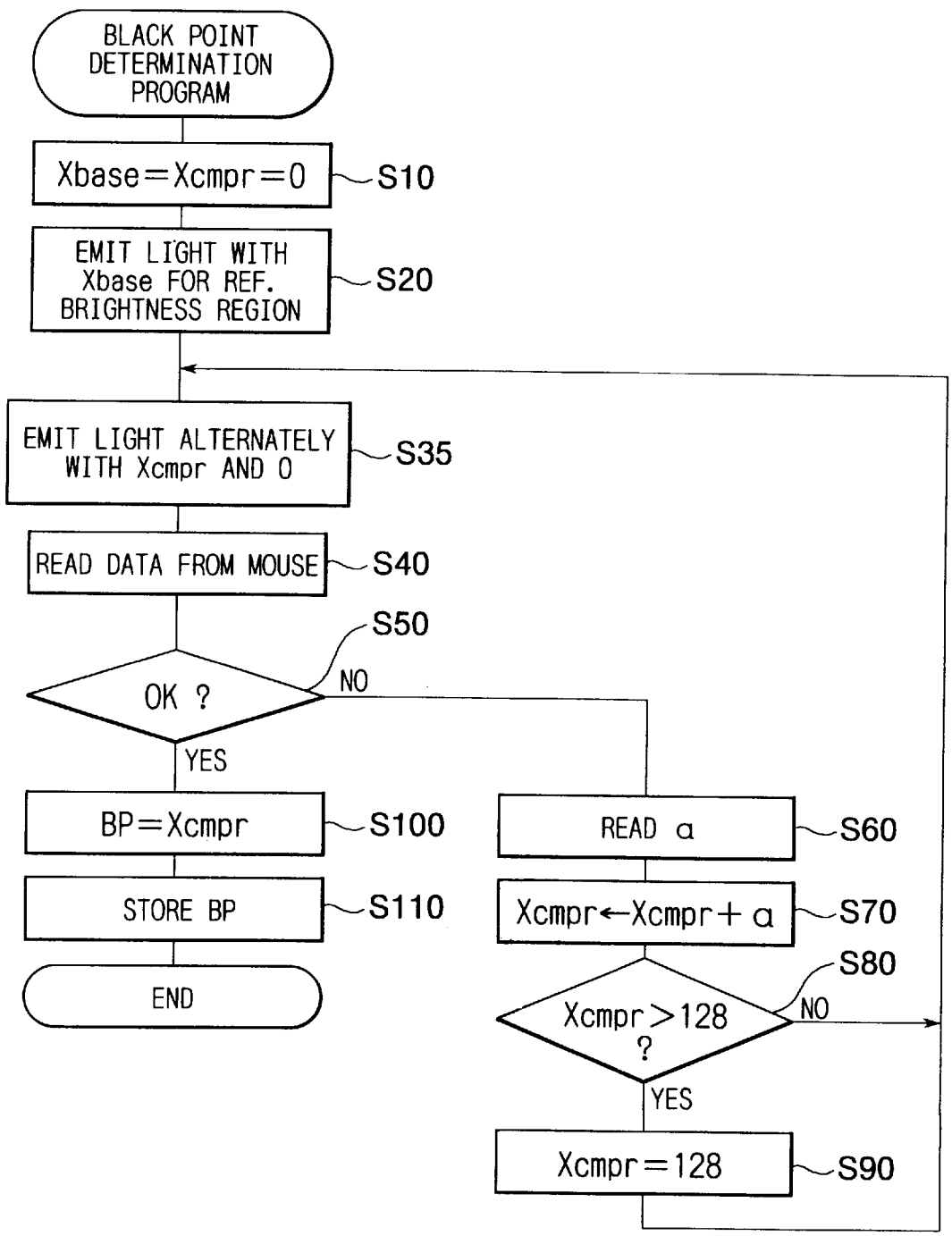
FIG. 6 is a flowchart for illustrating a black point determination program according to a second embodiment of the present invention.

Next, a second embodiment of the invention will be described. The second embodiment is similar to the first embodiment but differs slightly therefrom in the contents of the black point determination program. In the second embodiment, as shown in FIG. 6, in lieu of S30 in the flowchart of FIG. 5, $R=G=B=X_{cmpr}$ and $R=G=B=0$ are alternately given to each pixel in the comparison brightness region 11 so as to provide display the comparison brightness region 11 in a flickering mode (S35). Specifically, the comparison brightness region 11 alternately emits at a brightness equal to the brightness in the reference brightness region 12 and at a brightness corresponding to the input value $X_{cmpr}$. The remaining features of the second embodiment is exactly same as those in the first embodiment. In the second embodiment, the star mark can be easily found through flickering of the star mark.

Figure 7:
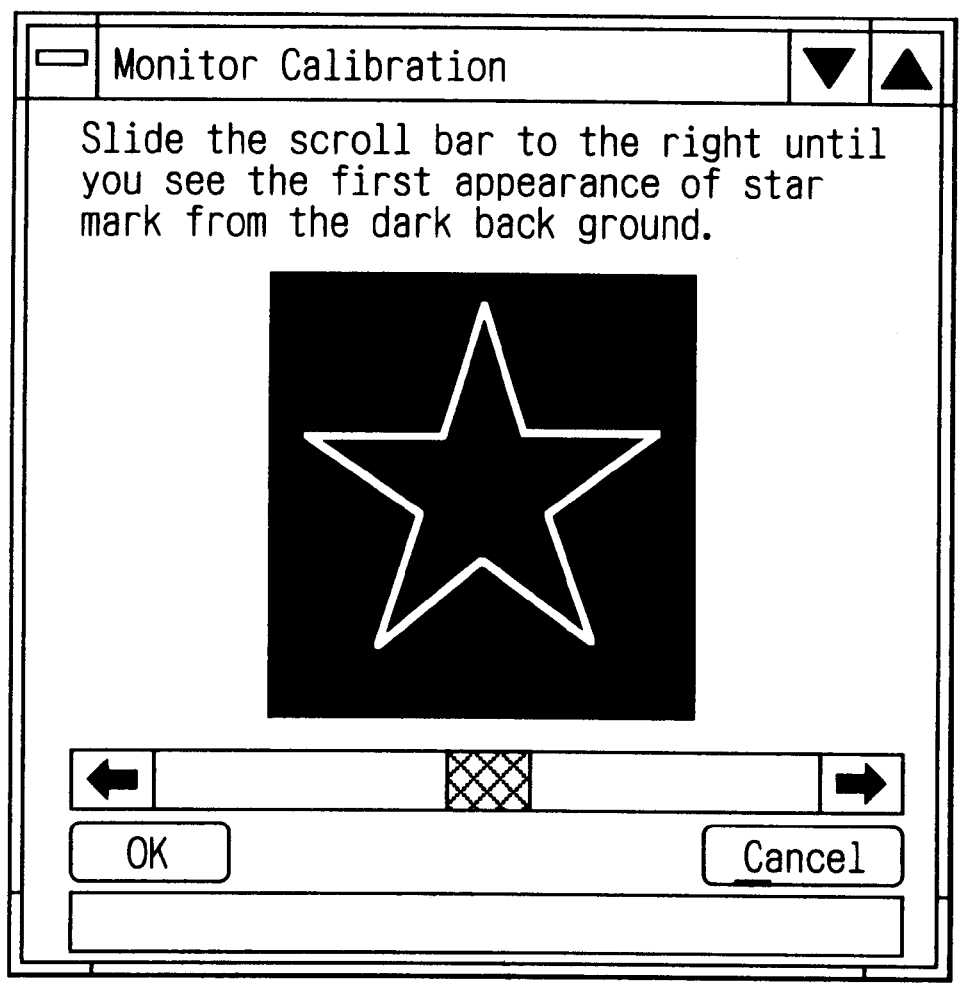
FIG. 7 is an explanatory diagram showing a screen used when determining a black point according to the third embodiment of the present invention.
Figure 8:
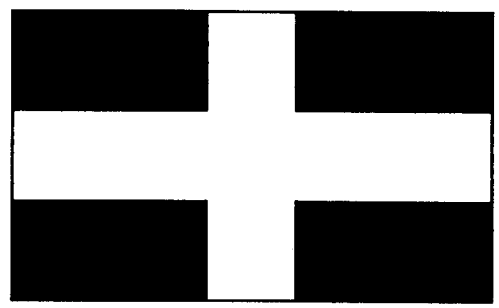
FIGS. 8(a) through 8(d) are explanatory diagrams showing images used for determining the black point according to modifications of the embodiments of the invention.
Figure 8:
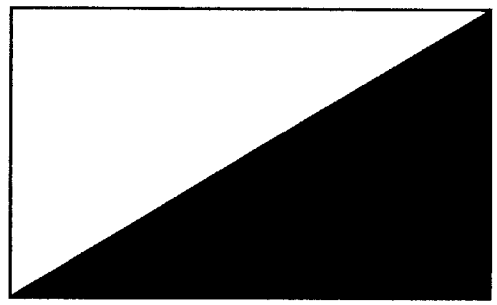
Figure 8:
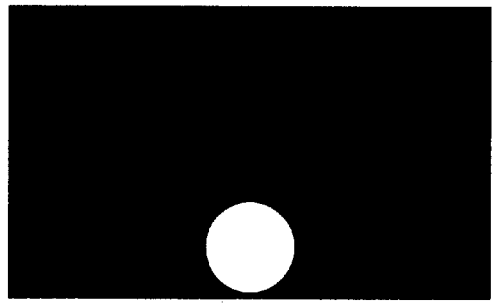
Figure 8:
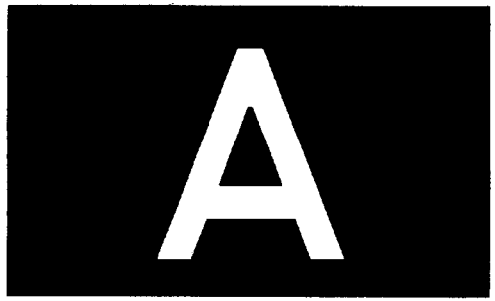

A third embodiment of the invention is shown in FIG. 7. As shown therein, the comparison brightness region, i.e., the star mark, is defined only by lines. It may be easier for the operator to draw his or her attention to lines appearing on the black background and easy to find the appearance of lines on the display through the increase of the line brightness.

The black point determined according to the above-described embodiments gives a display characteristic of the display unit 2. Hence, these embodiments can be applied to data processing to match the displayed color on the display unit 2 with the printed color by a color printer. The embodiments are also applicable to color adjustment of a color display unit 2.

Figure 9:
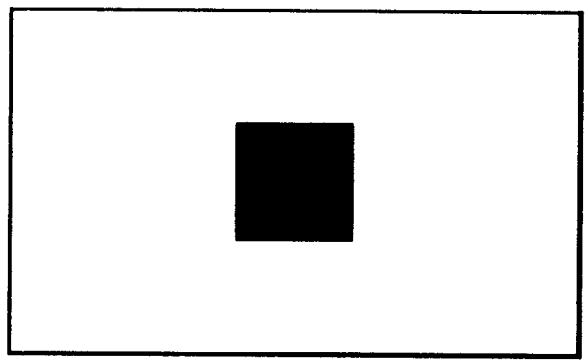
FIGS. 9(a) through 9(c) are explanatory diagrams showing images used for determining the black point according to another modifications of the embodiments of the invention.
Figure 9:
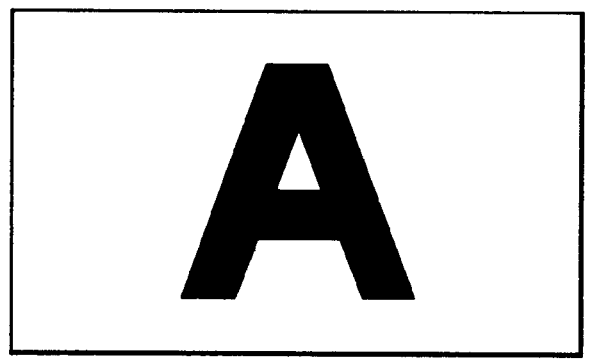
Figure 9:
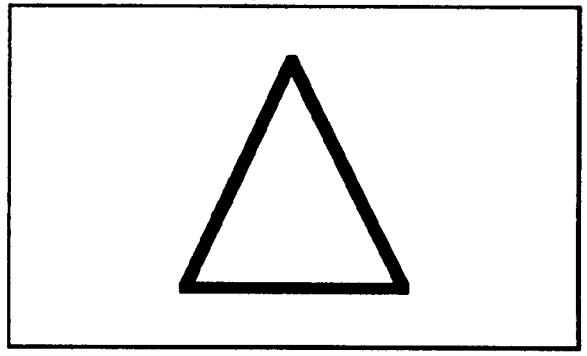

While various exemplary embodiments of this invention have been described in detail, those skilled in the art will recognize that there are many possible modifications and variations which may be may in these exemplary embodiments while yet retaining many of the novel features and advantages of the invention. For example, the comparison brightness region as shown in FIGS. 8(a) through 8(d) may be employed. The comparison brightness region may be a background with respect to the reference brightness region as shown in FIGS. 9(a) through 9(c). The characters, symbols or figures other than those shown in FIGS. 8(a) through 8(d) and FIGS. 9(a) through 9(c) may be employed.

In the embodiments of the present invention, although the input value for the reference brightness region is set to $X_{base}=0$, the input value may be any number insofar as it is less than the black point BP. Each pixel within the reference brightness region may be applied with different input value less than the black point BP. In addition, the input value X for a pixel may be varied with time insofar as it is within a range of $0 \leq X < BP$, because the input value less than the black point BP is uniformly perceived by a user as black.

Although in the above-described embodiments, the reference brightness region is set to emit with $R=G=B=X_{base}$, and the comparison brightness region with $R=G=B=X_{cmpr}$, the reference brightness region may be set to emit with $R=X_{base}$, $G=B=0$, and the comparison brightness region with $R=X_{cmpr}$, $G=B=0$. The reference brightness region may be set to emit with $R=0$, $G=X_{base}$, $B=0$ or $R=0$, $G=X_{base}$, $B=0$, or $R=0$, $G=X_{cmpr}$, $B=0$. In another example, the reference brightness region may be set to emit $R=G=0$, $B=X_{base}$, and the comparison brightness region with $R=G=0$, $B=X_{cmpr}$. The black point BP can thus be obtained with respect to each of red, green and blue colors.

What is claimed is:

1. A method of determining a black point on a display unit, comprising the steps of:

displaying on the display unit a first region emitting at a reference brightness used as a reference for determining the black point and set by inputting a predetermined input value to the display unit, and a second region emitting at a comparison brightness set by inputting an input value differing from the predetermined input value, a selected one of the first region and the second region being completely surrounded by a non-selected one of the first region and the second region;

obtaining, by dynamically increasing and decreasing the input value for displaying the second region, a critical input value representing the input value wherein an operator can first distinguish the second region from the first region; and determining the black point based on the critical input value.

2. The method according to claim 1, wherein the first region is displayed on the display unit as a background for the second region.

3. The method according to claim 2, wherein the second region takes a form of a character, a symbol or a figure.

4. The method according to claim 1, wherein the second region is displayed on the display unit as a background for the first region.

5. The method according to claim 4, wherein the first region takes a form of a character, a symbol or a figure.

6. A method of determining a black point on a display unit, comprising the steps of:

displaying on the display unit a first region emitting a reference brightness used as a reference for determining the black point and set by inputting a predetermined input value to the display unit, and a second region emitting a comparison brightness set by inputting an input value differing from the predetermined input value, the second region having at least one contour line defining an outline of the second region, the at least one contour line intersecting an imaginary vertical line drawn on the display unit when the display unit is placed in an orientation in which the display unit is intended to be used;

obtaining, by dynamically increasing and decreasing the input value for displaying the second region, a critical input value representing the input value wherein an operator can first distinguish the second region from the first region; and determining the black point based on the critical input value.

7. The method according to claim 6, wherein the first region and the second region have an area substantially equal to each other.

8. The method according to claim 6, wherein a selected one of the first region and the second region is completely surrounded by a non-selected one of the first region and the second region.

9. A method of determining a black point on a display unit, comprising the steps of:

displaying on the display unit a first region emitting at a reference brightness used as a reference for determining the black point and set by inputting a predetermined input value to the display unit, and a second region emitting at a comparison brightness set by inputting an input value differing from the predetermined input value, either the first region or the second region being defined only by lines;

obtaining, by dynamically increasing and decreasing the input value for displaying the second region, a critical input value representing the input value wherein an operator can first distinguish the second region from the first region; and determining the black point based on the critical input value.

10. The method according to claim 9, wherein the lines defining the first region or the second region take a form of a character, a symbol or a figure.

11. A method of determining a black point on a display unit, comprising the steps of:

displaying on the display unit a first region emitting at a reference brightness used as a reference for determining the black point and set by inputting a predetermined input value to the display unit, and a second region emitting at a comparison brightness set by inputting an input value differing from the predetermined input value;

alternately inputting the predetermined input value and the input value to the display unit to display the second region in a flickering mode wherein the second region alternately emits at a brightness equal to the reference brightness and at a brightness corresponding to the input value;

obtaining, by dynamically increasing and decreasing the input value for displaying the second region, a critical input value representing the input value wherein an operator can first distinguish the second region from the first region; and determining the black point based on the critical input value.

12. The method according to claim 11, wherein the input value that can be input to the display unit has a range from a minimum value to a maximum value, the minimum value causing a brightness on the display unit to a lowest level and the maximum value causing the brightness on the display unit to a highest, and wherein the predetermined input value is set to the minimum value.

13. An apparatus for determining a black point on a display unit, comprising:

first region generating means for generating a reference brightness region on the display unit, the reference region emitting at a reference brightness used as a reference for determining the black point and set by inputting a predetermined input value to the display unit;

second region generating means for generating a comparison brightness region on the display unit, the comparison brightness region emitting at a comparison brightness set by inputting an input value differing from the predetermined input value, a selected one of the reference brightness region and the comparison brightness region being completely surrounded by a non-selected one of the reference brightness region and the comparison brightness region;

increasing/decreasing means for dynamically increasing and decreasing the input value for displaying the comparison brightness region;

instruction input means for allowing an operator to input an instruction regarding determination of the black point; and black point computing means for computing the black point based on the input value set by said increasing/decreasing means when the operator inputs the instruction through said instruction input means.

14. The apparatus according to claim 13, wherein the reference brightness region generated by said first region generating means is displayed on the display unit as a background for the comparison brightness region generated by said second region generating means.

15. The apparatus according to claim 14, wherein said second region generating means generates a character, a symbol or a figure as the comparison brightness region.

16. The apparatus according to claim 13, wherein the comparison brightness region generated by said second region generating means is displayed on the display unit as a background for the reference brightness region generated by said first region generating means.

17. The apparatus according to claim 16, wherein said first region generating means generates a character, a symbol or a figure as the reference brightness region.

18. The apparatus according to claim 13, wherein the reference brightness region is completely surrounded by the comparison brightness region.

19. The apparatus according to claim 13, wherein the comparison brightness region is completely surrounded by the reference brightness region.

20. An apparatus for determining a black point on a display unit, comprising:

first region generating means for generating a reference brightness region on the display unit, the reference region emitting at a reference brightness used as a reference for determining the black point and set by inputting a predetermined input value to the display unit;

second region generating means for generating a comparison brightness region on the display unit, the comparison brightness region emitting at a comparison brightness set by inputting an input value differing from the predetermined input value, the comparison brightness region having at least one contour line defining an outline of the comparison brightness region, the at least one contour line intersecting an imaginary vertical line drawn on the display unit when the display unit is placed in an orientation in which the display unit is intended to be used;

increasing/decreasing means for dynamically increasing and decreasing the input value for displaying the comparison brightness region;

instruction input means for allowing an operator to input an instruction regarding determination of the black point; and black point computing means for computing the black point based on the input value set by said increasing/decreasing means when the operator inputs the instruction through said instruction input means.

21. The apparatus according to claim 20, wherein the reference brightness region and the comparison brightness region have an area substantially equal to each other.

22. The apparatus according to claim 20, wherein a selected one of the reference brightness region and the comparison brightness region is completely surrounded by a non-selected one of the reference brightness region and the comparison brightness region.

23. An apparatus for determining a black point on a display unit, comprising:

first region generating means for generating a reference brightness region on the display unit, the reference region emitting at a reference brightness used as a reference for determining the black point and set by inputting a predetermined input value to the display unit;

second region generating means for generating a comparison brightness region on the display unit, the comparison brightness region emitting at a comparison brightness set by inputting an input value differing from the predetermined input value, either the reference brightness region or the comparison brightness region being defined only by lines;

increasing/decreasing means for dynamically increasing and decreasing the input value for displaying the comparison brightness region;

instruction input means for allowing an operator to input an instruction regarding determination of the black point; and black point computing means for computing the black point based on the input value set by said increasing/decreasing means when the operator inputs the instruction through said instruction input means.

24. The apparatus according to claim 23, wherein the lines defining the reference brightness region or the comparison brightness region take a form of a character, a symbol, or a figure.

25. An apparatus for determining a black point on a display unit, comprising:

first region generating means for generating a reference brightness region on the display unit, the reference region emitting at a reference brightness used as a reference for determining the black point and set by inputting a predetermined input value to the display unit;

second region generating means for generating a comparison brightness region on the display unit, the comparison brightness region emitting at a comparison brightness set by inputting an input value differing from the predetermined input value, the display unit being alternately input with the predetermined input value and the input value to display the comparison brightness region in a flickering mode wherein the comparison brightness region alternately emits at a brightness equal to the reference brightness and at a brightness corresponding to the input value;

increasing/decreasing means for dynamically increasing and decreasing the input value for displaying the comparison brightness region;

instruction input means for allowing an operator to input an instruction regarding determination of the black point; and black point computing means for computing the black point based on the input value set by said increasing/decreasing means when the operator inputs the instruction through said instruction input means.

26. The apparatus according to claim 25, wherein the input value that can be input to the display unit has a range from a minimum value to a maximum value, the minimum value causing a brightness on the display unit to a lowest level and the maximum value causing the brightness on the display unit to a highest, and wherein the predetermined input value is set to the minimum value.

* * * * *